United States Patent
Drews et al.

(10) Patent No.: US 8,212,211 B2
(45) Date of Patent: Jul. 3, 2012

(54) SYSTEM FOR PROTECTING AND/OR GUIDING PERSONS IN DANGEROUS SITUATIONS

(75) Inventors: Ralf Drews, Lübeck (DE); Stefan Morley, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 715 days.

(21) Appl. No.: 12/327,997

(22) Filed: Dec. 4, 2008

(65) Prior Publication Data

US 2009/0184244 A1 Jul. 23, 2009

(30) Foreign Application Priority Data

Jan. 17, 2008 (DE) .......... 10 2008 004 785

(51) Int. Cl.
*H01L 31/00* (2006.01)
*G02B 13/14* (2006.01)
(52) U.S. Cl. ........... 250/330; 359/356
(58) Field of Classification Search ............ 250/330; 359/356
See application file for complete search history.

(56) References Cited

U.S. PATENT DOCUMENTS

| | | | | |
|---|---|---|---|---|
| 6,121,881 A | * | 9/2000 | Bieback et al. | 340/573.1 |
| 6,476,391 B1 | * | 11/2002 | Zhang | 250/330 |
| 6,720,878 B2 | * | 4/2004 | Jumpertz | 340/573.1 |
| 7,170,058 B2 | * | 1/2007 | Miyano et al. | 250/330 |
| 7,598,856 B1 | * | 10/2009 | Nick et al. | 340/539.13 |
| 2005/0184869 A1 | * | 8/2005 | Micko | 340/567 |
| 2006/0216011 A1 | | 9/2006 | Godehn | |

FOREIGN PATENT DOCUMENTS

| | | |
|---|---|---|
| DE | 102 59 123 B3 | 9/2004 |
| DE | 103 47 894 B4 | 5/2005 |
| WO | 03/059455 A2 | 7/2003 |
| WO | 2005/016046 A1 | 2/2005 |

* cited by examiner

*Primary Examiner* — David Porta
*Assistant Examiner* — Mindy Vu
(74) *Attorney, Agent, or Firm* — McGlew and Tuttle, P.C.

(57) ABSTRACT

The invention provides a system and process in which more than only one category of information must be made available in an optically simultaneously recognizable form to a person in a portable system (17) for protecting and/or guiding persons in dangerous situations, firefighters or rescue teams in buildings. The system includes an infrared camera (12) for recording data, especially heat image data; an energy supply device, especially a battery; at least one interface (18) for transmitting data; and at least one display device (16), especially a monitor and/or a warning light, for visually displaying data. At least one exit finder (13) and/or at least one gas sensor (14) and/or at least one motion detector is also provided. The data determined by the at least one exit finder (13) and/or by the at least one gas sensor (14) and/or by the at least one motion detector and the heat image data of the infrared camera (12) can be displayed on the display of the at least one display device (16) such that the visually displayed data and visually displayed heat image data are visible by the person within a field of vision.

20 Claims, 3 Drawing Sheets

SYSTEM FOR PROTECTING AND/OR GUIDING PERSONS IN DANGEROUS SITUATIONS

CROSS REFERENCE TO RELATED APPLICATIONS

This application claims the benefit of priority under 35 U.S.C. §119 of German Patent Application DE 10 2008 004 785.6 filed Jan. 17, 2008, the entire contents of which are incorporated herein by reference.

FIELD OF THE INVENTION

The present invention pertains to a portable system for protecting and/or guiding persons in dangerous situations, especially firefighters or rescue teams in buildings, comprising an infrared camera for recording data, especially heat image data; an energy supply means, especially a battery; at least one interface for transmitting data; and at least one display means, especially a monitor and/or a warning light, for visually displaying data. The present invention pertains, furthermore, to processes for protecting and/or guiding persons in dangerous situations, especially firefighters or rescue teams in buildings, with the steps of recording a heat image with an infrared camera; converting the heat image into heat image data; transmitting the heat image data by means of at least one interface for transmitting data to at least one display means and visually displaying the heat image data in at least one display means.

BACKGROUND OF THE INVENTION

Firefighters and rescue teams must perform activities under very difficult environmental conditions in fires or other dangerous situations in buildings or industrial plants. Visibility is often greatly reduced due to the smoke occurring in a fire, so that an infrared camera is used as a visual aid.

Furthermore, it is necessary during activities performed in buildings or industrial plants that the mission members must be able to find a certain target, i.e., a person to be rescued or a source of fire within the building or industrial plant or the exit in order to be able to leave the building or the industrial plant. So-called exit finders are used for this, which can determine the position of a member of the rescue team and show the member the direction in which the member of the rescue team has to move in order to reach the target, taking into account the structure of the building or the industrial plant.

To determine the position, exit finders use, for example, GPS or active transmitters or passive transmitters/receivers (RFID, radio frequency identification device), which are placed by the member of the rescue team. The exit finder shows the direction and distance from the last active transmitter placed and thus the direction of or the path leading to the exit. Furthermore, exit finders use WLAN transmitters for determining the position, which were arranged on the outside walls as fixed points at the time of the construction of the building or later. The exit finder receives the data on the structure of a building or industrial plant, for example, from a transponder arranged in the entrance area.

Portable gas sensors are used, for example, to detect toxic or explosive gases. The infrared camera, exit finder and gas sensors are used and carried as separate devices.

A device and process for monitoring the mission of persons using respirators are known from DE 102 59 123 B3. An image detection means receives image signals, which correspond to an image falling on the eyes of the person carrying the device. The instantaneous position of the person carrying the device is determined by analyzing the image signals by means of the topology of the building, which is stored in a storage medium. The person carrying the device can reach the target as a result, i.e., this is only an exit finder. The system is incapable of receiving other categories of information, for example, those of an infrared camera or a gas sensor.

DE 103 47 894 B4 shows a device and process for the controlled entry into or leaving an area. A signal transmitter, which transmits a person-related code, is attached to a person. Position marks represent a position or direction code for passing through an access or exit at entrances and exits of the area. A computing unit analyzes the code of the signal transmitter and the position or direction code received by a receiving means and determines the position of the person. As a result, a state of warning can be triggered when the person reaches a position, or an escape signal showing the escape route can be generated. The device makes it only possible to locate the person, so that additional categories of information that are important for a member of the rescue team in a dangerous situation, e.g., heat images or gas concentrations, cannot be made available.

SUMMARY OF THE INVENTION

The object of the present invention is therefore to make available a system and process for protecting and/or guiding persons in dangerous situations, especially firefighters and rescue teams in buildings, which makes available to the person in question more than only one category of information, which is optically simultaneously recognizable.

This object is accomplished with a portable system for protecting and/or guiding persons in dangerous situations, especially firefighters or rescue teams in buildings, comprising an infrared camera for recording data, especially heat image data; an energy supply means, especially a battery; at least one interface for transmitting data; and at least one display means, especially a monitor and/or warning light, for visually displaying data, wherein the system comprises at least one exit finder and/or at least one gas sensor and/or at least one motion detector, wherein the data detected by the at least one exit finder and/or at least one gas sensor and/or at least one motion detector and the heat image data of the infrared camera can be displayed on the display of the at least one display means such that the visually displayed data and visually displayed heat image data are visible within a field of vision of a person. The person can thus simultaneously optically perceive the information of at least four categories of information, namely, information from the infrared camera, from the exit finder, from the gas sensor and from the motion detector, so that attention to different display means is not necessary and all categories of information reach the person without time delay.

In another embodiment, the at least one display means for the at least one exit finder and/or at least one gas sensor and/or at least one motion detector is arranged at and/or in a housing of the infrared camera.

In an additional embodiment, the at least one exit finder and/or at least one gas sensor and/or at least one motion detector are an external assembly unit that is separate from the infrared camera.

In an additional embodiment, the at least one exit finder and/or at least one gas sensor and/or at least one motion detector can be detachably connected to the housing of the infrared camera in order to obtain a modular design of the system. As a result, at least one exit finder and/or at least one gas sensor and/or at least one motion detector can be coupled with the infrared camera in a modular design depending on the needs.

The at least one exit finder and/or at least one gas sensor and/or at least motion detector can be preferably connected to the housing of the infrared camera by means of a mechanical connection, especially a plug-in and/or snap-in connection.

In particular, the at least one exit finder and/or at least one gas sensor and/or at least one motion detector is integrated on and/or in a housing for the infrared camera. As a result, the person who is in a dangerous situation has all categories of information at any time, because all units are integrated into one assembly unit.

The data of the at least one exit finder and/or of the at least one gas sensor and/or of the at least one motion detector can advantageously be transmitted to the at least one display means by means of at least one wired and/or at least one wireless interface.

In another embodiment, the at least one gas sensor is an electrochemical and/or optical and/or catalytic sensor and/or a semiconductor sensor.

In an additional embodiment, the system is equipped with an audio warning means.

The system preferably comprises a display means with only one monitor. All categories of information can thus be displayed for the person who is in a dangerous situation in a simultaneously visible manner in an especially clear and cost-effective manner.

The process according to the present invention for protecting and/or guiding persons in dangerous situations, especially firefighters or rescue teams in buildings, has the following steps: recording of a heat image with an infrared camera; conversion of the heat image into data, especially heat image data; transmission of the heat image data by means of at least one interface for transmitting data to at least one display means; and visual display of the heat image data in at least one display means, wherein the data of at least one exit finder and/or at least one gas sensor and/or at least one motion detector are transmitted by means of the at least one interface to the at least one display means and visually displayed within the field of vision of a person by means of the at least one display means together with the heat image data.

The data and heat image data are displayed visually by one display means only in another embodiment.

The data of the at least one exit finder and/or of the at least one gas sensor and/or of the at least one motion detector are preferably transmitted by means of a wired and/or wireless interface to the at least one display means.

In an additional embodiment, the data from the at least one gas sensor are analyzed by a computing unit, so that a visual and/or audio warning is triggered beginning from a certain threshold value of a gas concentration.

The at least one motion detector is advantageously an optical motion detector, and local motions within the heat image are identified from the heat image data by means of an algorithm stored in the computing unit.

In another embodiment, a visual and/or audio warning is triggered in case of local motions within the heat image.

In particular, the data of the at least one exit finder and/or at least one gas sensor and/or at least one motion detector are displayed graphically by the at least one display means.

In another embodiment, the at least one exit finder and/or at least one gas sensor and/or at least one motion detector and/or infrared camera use the computing unit together.

The at least one display means preferably displays a heat image recorded by the infrared camera.

The present invention comprises, furthermore, a computer program with program code means, which are stored on a computer-readable data storage medium, in order to carry out an above-described process when the computer program is run on a computer or a corresponding computing unit.

In addition, a computer program product with program code means, which are stored on a computer-readable data storage medium in order to carry out an above-described process when the computer program is run on a computer or a corresponding computing unit, is part of the present invention.

An exemplary embodiment of the present invention will be described in more detail below with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
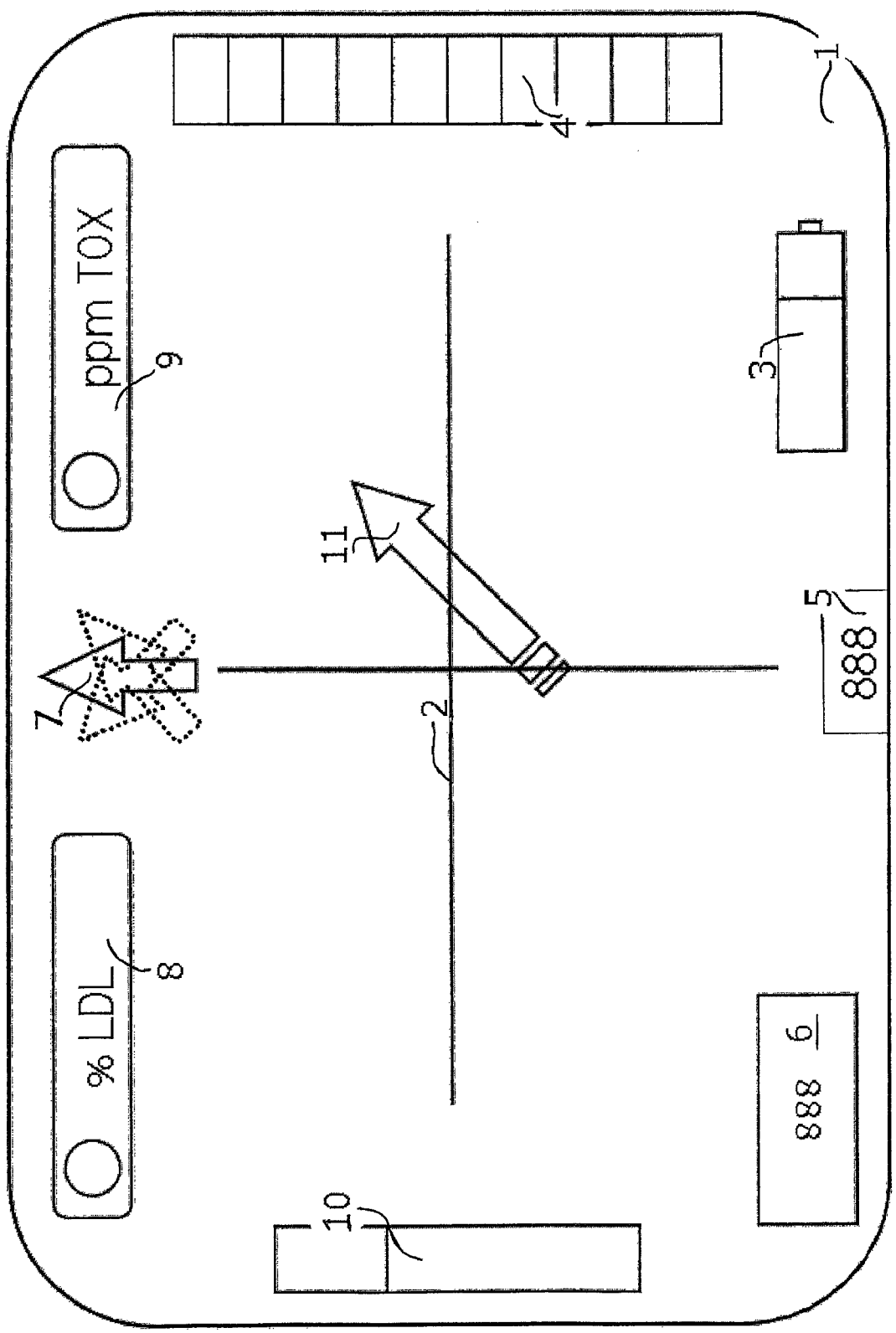
FIG. 1 is a view of a display of a display means of a system for protecting and/or guiding persons in dangerous situation according to the invention.

Referring to the drawings in particular, a battery 22 for energy supply and a monitor 28 of a display means 16 are installed in a housing 20 of an infrared camera 12 with infrared detector head 30. The heat image data 21 recorded by the infrared camera 12 are transmitted by a wired interface 18 to the display means 16. A computing unit 15 installed in the housing 20 is used to analyze and process the heat image data 21 and is in connection with the infrared camera 12 and with the display means 16 by means of the interface 18. The infrared camera 12 with the housing 20 is portable and is used by a firefighter for optical orientation in a building in which visibility is greatly reduced because of smoke or darkness.

Figure 3:
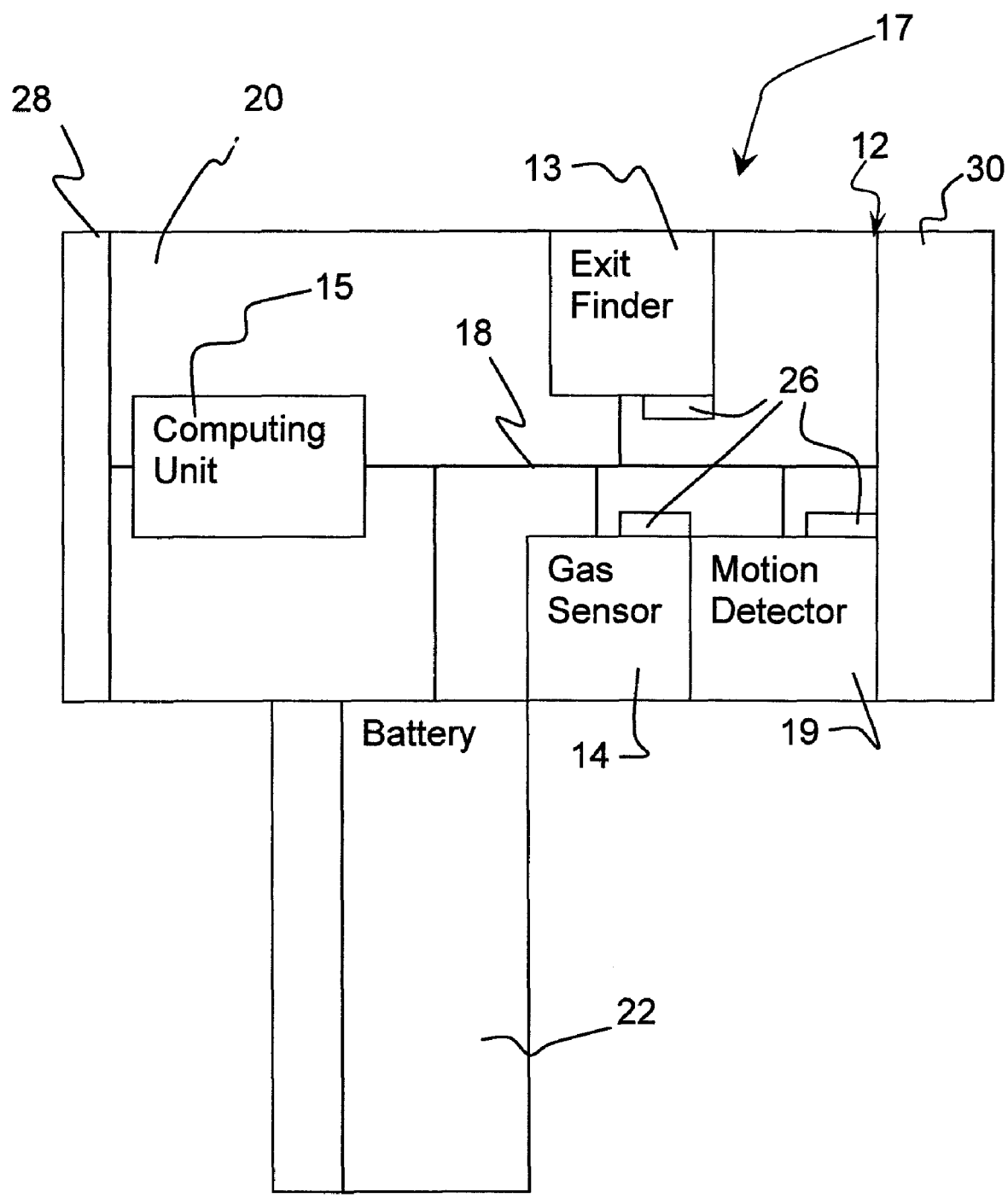
FIG. 3 is a schematic view of an infrared camera housing with system features according to the invention.

An exit finder 13, a gas sensor 14 for combustible or explosive gases as well as a gas sensor 14 for toxic gases are installed on the housing 20 of the infrared camera 12 (See FIG. 3). The data determined by the gas sensors 14 are analyzed by an algorithm stored in the computing unit 15 to determine whether they exceed certain threshold values. The fact that the threshold values are exceeded may cause that the combustible or explosive gases will suddenly ignite upon entry of oxygen and a so-called "flashover" occurs. The system 17 thus has a flashover detector with a flashover display 10.

The exit finder 13 also uses the computing unit 15, i.e., it has no additional computing unit 15 of its own. The exit finder 13 is supported, for example, by GPS, and is typically used under a clear sky, e.g., in open industrial plants or during the fighting of forest fires. Furthermore, the exit finder can determine the position by means of an RFID system or WLAN transmitters. In one combination, the exit finder 13 can determine the position in closed buildings by means of the RFID system or WLAN transmitters and in open buildings by means of GPS, depending on availability.

The heat image data recorded by the infrared camera 12 as well as the data determined by the gas sensors 14 and the exit finder 13 are displayed by the display means 16 including a monitor 28. The display 1 of the monitor is shown in FIG. 1. The display 1 shows a heat image of the surroundings recorded by the infrared camera 12, which heat image is not shown in FIG. 1. Different colors are assigned here to different temperatures or temperature ranges. An optional cross hairs 2 is arranged in the center of the display. At the lower right-hand edge, a battery charge status display 3 shows the state of charge of the battery. The firefighter may optionally fade a color or temperature conversion scale 4 into the display 1. This makes it possible to assign a certain temperature or a temperature range to the colors shown in the heat image. An absolute temperature display 5 shows the temperature at a certain point of the display, e.g., in the center of the cross hairs 2. For orientation in space, the local GPS coordinates are displayed to the firefighter, if possible, in a local coordinate display 6, and the direction to the exit is displayed by means of the exit arrow 7. The measured values of the gas sensors 14 for combustible or explosive gases are displayed in a first gas concentration display 8, and the measured values of the gas sensors 14 for toxic gases are displayed in a second gas concentration display 9. An algorithm stored in the computing unit 15 analyzes the data determined by the gas sensors 14 and indicates the probability with which certain limit values are exceeded. This probability is displayed graphically in the flashover display 10. An arrow 11 blinking centrally in the middle of the display 1 is the display of the motion of the firefighter. The site of a gas alarm is stored by the exit finder 13 and the type, distance and time elapsed since the gas alarm are faded in (not shown) in the display 1 of monitor 28 or the display means 16.

In a second exemplary embodiment, the system 17 also has an optical motion detector 19. An algorithm, which localizes a relative motion in the heat image recorded by the infrared camera 12 within a sector, is stored for this in the computer unit 15, and the infrared camera 12 itself is being moved by the firefighter as well. As a result, a motion caused, for example, by a person who is to be rescued can be recognized even with the infrared camera moving and displayed graphically in the display 1 or also indicated by means of an audio warning signal.

In a third exemplary embodiment, the display means 16 is not installed in the housing of the infrared camera 12, but includes a monitor 28 integrated in the helmet of the firefighter in a head-up design, so that the firefighter does not have to look separately into the display means 16 to view the display 1. The data and heat image data are transmitted to the display means 16 by means of a wireless interface 18. The third exemplary embodiment otherwise corresponds to the first and/or second exemplary embodiment.

Figure 2:
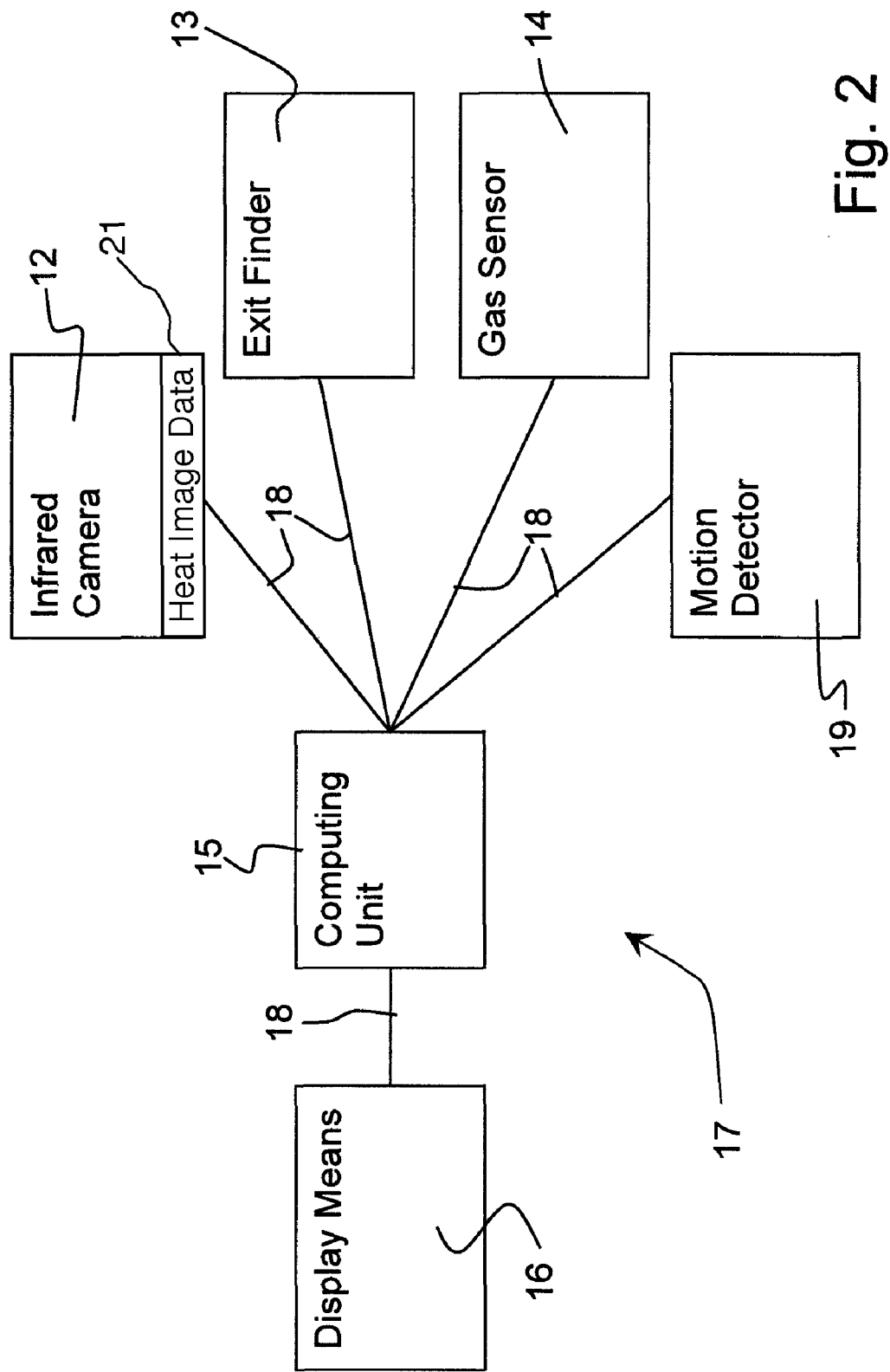
FIG. 2 is a block diagram of the system for protecting and/or guiding persons in dangerous situations according to the invention.

In a fourth exemplary embodiment, the exit finder 13 and/or gas sensors 14 and/or motion detector 19 are not integrated in the housing of in the infrared camera 12, but are separate components. The exit finder 13 and/or gas sensors 14 and/or motion detector 19 may be connected to the infrared camera 12, namely to the computing unit 15 in the camera housing 20 with plug-in and counterplug connections 26 and with a wired interface 18 as shown in FIG. 3. The further data device (13 and/or 14 and/or 19) may be connected to infrared camera 12 or to the computing unit 15 with a wireless interface 18 as schematically illustrated in FIG. 2. In the embodiment shown in FIG. 3, the exit finder 13 and/or gas sensors 14 and/or motion detector 19 may be connected to the housing of the infrared camera 12 detachably in a modular design. The advantages described in the exemplary embodiments described above can also be achieved as a result. The fourth exemplary embodiment otherwise corresponds to the other exemplary embodiments described above.

In a fifth exemplary embodiment the display means 16 comprises two monitors 28 or a monitor with two displays 1 that are arranged in the system 17 according to the present invention such that the two or more displays 1 of the display means 16 can be viewed simultaneously by the firefighter. For example, a monitor 28 with a display 1 may be provided for the exit finder 13 and for the gas sensors 14, present at the infrared camera 12 next to a monitor 28 with a display 1 for the heat image. The different categories of information can be simultaneously recognized by the firefighter as a result. The fifth exemplary embodiment otherwise corresponds to the other exemplary embodiments described above.

On the whole, safety can be considerably improved with the portable system 17 according to the present invention for protecting and/or guiding persons in dangerous situations, especially firefighters or rescue teams in buildings. Gas sensors 14 and exit finders 13 were used before separately from an infrared camera 12 as stationary or mobile devices. To make it possible to recognize the optical display means 16 of these devices, it was necessary to look away from the display means 16 of the infrared camera 12 and to look at the display means 16 of these devices. The heat image of the infrared camera 12 was no longer able to be perceived as a result. Furthermore, it was not possible to see at the same time the optical display means 16 of the gas sensors 14 and of the exit finder 13 when viewing the heat image, so that early and immediate perception was not possible. The system 17 according to the present invention makes it possible to transmit the data from all categories of information i.e., heat image data and the data from the exit finder 13 and/or gas sensors 14 and/or motion detector 19 to the member of the rescue team simultaneously and without time delay.

While specific embodiments of the invention have been shown and described in detail to illustrate the application of the principles of the invention, it will be understood that the invention may be embodied otherwise without departing from such principles.

What is claimed is:

1. A portable system for protecting and/or guiding persons in dangerous situations, guiding firefighters or guiding rescue teams in buildings, the system comprising:
   an infrared camera for recording data including heat image data;
   an energy supply means including a battery;
   a data interface for transmitting data;
   a display means including at least one of a monitor and a warning light for providing a visual display of data; and
   an optical motion detector, wherein the data determined by said motion detector and the heat image data of said infrared camera are displayed on said display of said display means such that visually displayed data and visually displayed heat image data are simultaneously visible by a person within a field of vision of said display of said display means, said optical motion detector identifying local motions within the heat image, said optical motion detector sends data identifying the local motions to said display means by said data interface, said display means visually identifies the local motions together with said heat image data within a single field of view of an individual person.

2. A portable system in accordance with claim 1, wherein:
said infrared camera includes an infrared camera housing; and
said display means displays data of said motion detector and is arranged on and/or in said infrared camera housing.

3. A portable system in accordance with claim 1, wherein said motion detector is an external assembly unit that is separate from said infrared camera.

4. A portable system in accordance with claim 3, wherein said motion detector forms a modular unit whereby said external assembly unit can be detachably connected to said housing of the infrared camera wherein the system forms a modular system.

5. A portable system in accordance with claim 4, wherein said motion detector can be connected to said housing of the infrared camera by means of a mechanical connection including a plug-in and/or snap-in connection.

6. A portable system in accordance with claim 1, wherein data of said motion detector can be transmitted to said display means by means of at least one of a wired and wireless interface.

7. A portable system in accordance with claim 1, further comprising:
a gas sensor being one of an electrochemical sensor, an optical sensor, a catalytic sensor and a semiconductor sensor, sensor data determined by said gas sensor and the heat image data of said infrared camera are displayed on said display of said display means such that visually displayed sensor data and visually displayed heat image data are simultaneously visible by a person within a field of vision of said display of said display means.

8. A portable system in accordance with claim 1, wherein said system is equipped with an audio warning means for providing an audible warning.

9. A portable system in accordance with claim 1, wherein the system has only one single said display means.

10. A portable system in accordance with claim 1, wherein:
said infrared camera includes an infrared camera housing; and
said optical motion detector is integrated on and/or in said infrared camera housing.

11. A portable system for protecting and/or guiding persons in dangerous situations, protecting and/or guiding firefighters or protecting and/or guiding rescue teams in buildings, the system comprising:
an infrared camera for recording a heat image and converting the heat image into data including heat image data;
a signal interface means for passing data signals;
a display means for providing a display of data, said camera sending heat image data to said display means by said signal interface for visually displaying the heat image data with said display means;
a further data device comprising a motion detector, said further data device sending data of said further data device to said display means by said signal interface means, said display means visually displaying data of said further data device together with said heat image data by said display means within a single field of view of an individual person, said motion detector being an optical motion detector identifying local motions within the heat image, said optical motion detector sends data identifying the local motions to said display means by said signal interface means, said display means visually identifies the local motions together with said heat image data within a single field of view of an individual person.

12. A process for protecting and/or guiding persons in dangerous situations, protecting and/or guiding firefighters or protecting and/or guiding rescue teams in buildings, the process comprises the steps of:
recording a heat image with an infrared camera;
converting the heat image into data including heat image data;
providing a signal interface means;
providing a display means;
transmitting the heat image data by said signal interface to said display means;
visually displaying the heat image data with said display means;
providing a further data device comprising at least one of an exit finder, a gas sensor and a motion detector;
transmitting data of said further data device to said display means by said signal interface means;
visually displaying data of said further data device with said heat image data by said display means within a field of view of a person,
providing a computing unit, wherein the motion detector is an optical motion detector, and local motions within the heat image are identified from the heat image data by an algorithm stored in the computing unit.

13. A process in accordance with claim 12, wherein the further data device data and heat image data are displayed visually by only one display element of said display means.

14. A process in accordance with claim 12, wherein the data of said further data device are transmitted to said display means by means of a wired and/or wireless interface comprising said signal interface means.

15. A process in accordance with claim 12, wherein the data from the gas sensor are analyzed by the computing unit, so that a visual and/or audio warning is triggered beginning from a certain threshold value of the data from the gas sensor.

16. A process in accordance with claim 12, wherein a visual and/or audio warning is triggered in case of local motions within the heat image.

17. A process in accordance claim 12, wherein said further data device includes said exit finder and said gas sensor and said motion detector and the data of the exit finder and the gas sensor and the motion detector are displayed graphically by the display means.

18. A process in accordance claim 12, wherein the further data device includes each of the exit finder and the gas sensor and the motion detector with data of each of the exit finder and the gas sensor and the motion detector wherein the exit finder and the gas sensor and the motion detector and/or the infrared camera use the computing unit together.

19. A process according to claim 12, further comprising providing a computer program stored on a computer-readable data storage medium to carry out the process steps, the computer program being run or a computer or on the computing unit.

20. A process for protecting and/or guiding persons in dangerous situations, protecting and/or guiding firefighters or protecting and/or guiding rescue teams in buildings, the process comprises the steps of:
recording a heat image with an infrared camera;
converting the heat image into data including heat image data;
providing a signal interface means;
providing a display means;
transmitting the heat image data by said signal interface to said display means;
visually displaying the heat image data with said display means;

providing an optical motion detector;

transmitting data of said optical motion detector to said display means by said signal interface means;

visually displaying data of said optical motion detector with said heat image data by said display means within a field of view of a person;

providing a computing unit connected to the optical motion detector;

identifying local motions within the heat image by the optical motion detector and the computing unit;

transmitting data identifying the local motions to said display means by said signal interface means;

visually displaying the data identifying the local motions together with the heat image data by the display means within a field of view of a person.

* * * * *